UNITED STATES PATENT OFFICE.

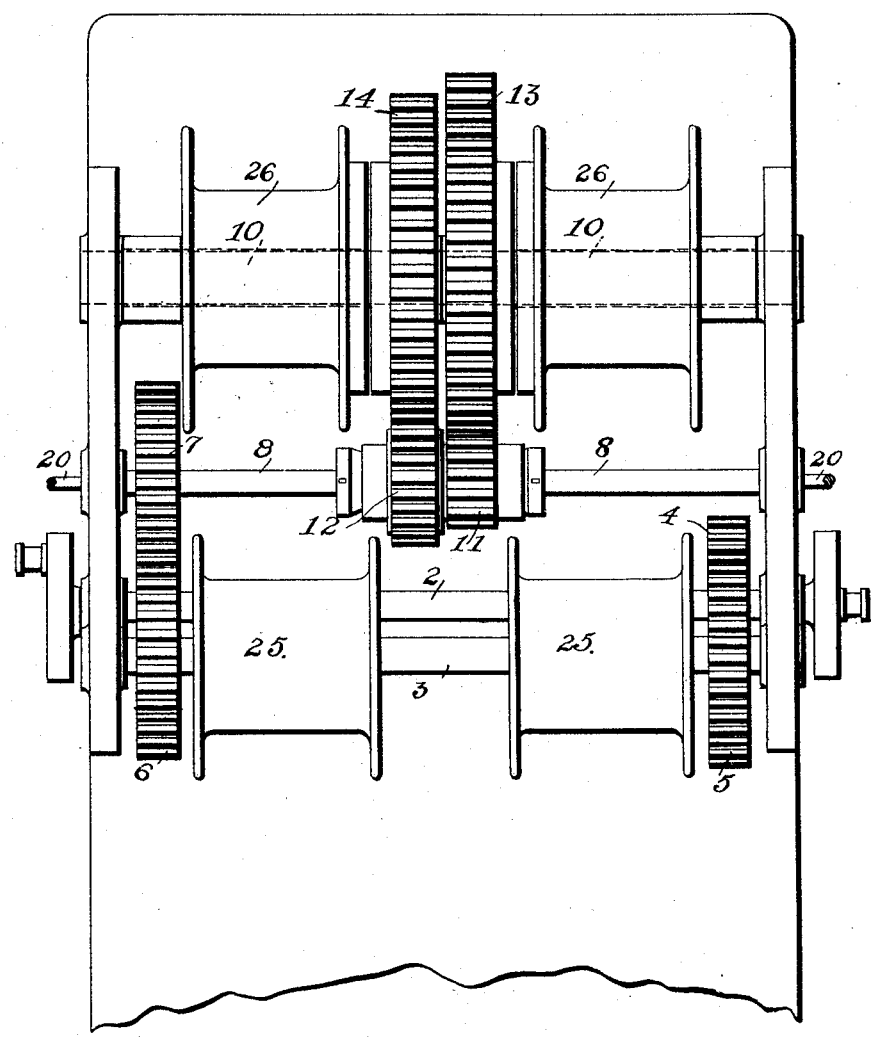

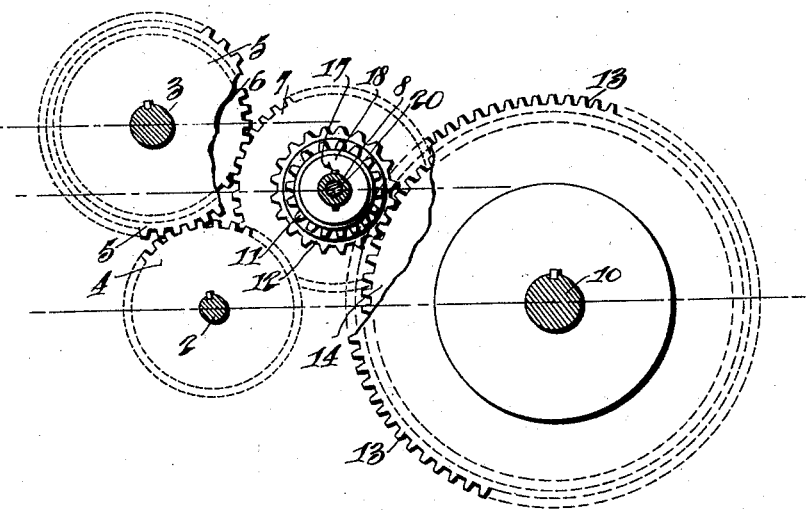
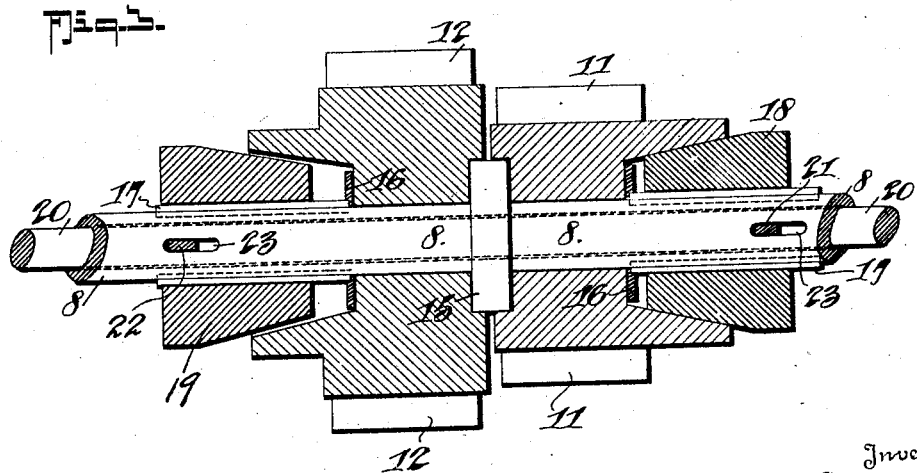

CHARLES M. STEVENSON, OF VANCOUVER, BRITISH COLUMBIA, CANADA.

LOGGING-ENGINE.

1,389,324. Specification of Letters Patent. Patented Aug. 30, 1921.

Application filed February 8, 1921. Serial No. 443,402.

*To all whom it may concern:*

Be it known that I, CHARLES M. STEVENSON, citizen of the Dominion of Canada, residing at Vancouver, in British Columbia, Canada, have invented certain new and useful Improvements in Logging-Engines, of which the following is a specification.

This invention relates to a means for driving the main line drum shaft of a logging engine, from the shaft of the haul-back drums by means of an intermediate shaft on which the speed change gears are mounted. This arrangement of gears facilitates the change of speed for the main line hauling drums and enables the rope leads to be taken from the upper side of all hauling drums with the engine running crank over outward.

Thus with the engine running in its proper direction, the ropes are under better observation of the driver and are clear of the ground in the immediate vicinity of the engine.

The invention is particularly described in the following specification, reference being made to the drawings by which it is accompanied, in which:

Figure 1 is a plan of the hauling drum gear of a logging donkey engine.

Fig. 2 is a sectional elevation of the same, and

Fig. 3, a detail to an enlarged scale of the gearing which is the particular subject of this application.

In these drawings 2 represents the crank shaft of the engine from which the haulback shaft 3 is driven by a gear 4 secured on the crank shaft, the teeth of which gear mesh with one 5 secured on the haul-back shaft 3. The drums 25 of the haul-back shaft are mounted free on it and are intended to be separably clutched to the shaft, but not being material to this application need not be further referred to.

On the haul-back shaft 3 is secured a gear 6, the teeth of which mesh with those of an equal gear 7 on the intermediate shaft 8 and driven at the same speed in revolutions.

The mechanism, which is the particular subject of this application, is that by which the main line drum shaft 10 is driven from this intermediate shaft 8.

On the shaft 8 near its mid-length, pinions 11 and 12 of different diameter are separately mounted to rotate free on the shaft. They are retained against end-wise movement on the shaft 8 by a collar 15 integral with or secured on the shaft between them and by a bearing ring 16 on the outer side of each pinion, the outer faces of which rings are notched to engage the ends of feathers 17 secured in the shaft and extending outward from each pinion, so that the bearing rings rotate with the shaft.

The teeth of the pinions 11 and 12 mesh with those of gear wheels 13 and 14 both secured on the main line drum shaft 10.

On the feathers 17 are slidably mounted clutching cones 18 and 19 which are adapted to fit corresponding conical recesses in the outer faces of the pinions 11 and 12. The cones being secured by the feathers to rotate with the shaft 8, whichever cone is moved to engage its pinion, that pinion will rotate with the shaft.

The conical clutching cones 18 and 19 are connected together to move endwise on the shaft by a rod 20 axially movable in the shaft 8, the cones being secured to the rod 20 by cotters 21, 22 which pass diametrically through the clutching cones and the axial rod 20 and through slots 23 in the shaft 8, which slots are elongated to permit the required endwise movement.

The cones 18 and 19 are secured at such distance apart by the rod 20 that when one cone is in driving engagement with its pinion the other one is free from engagement with the other pinion. The axial rod 20 passes through to one end or the other of the shaft 8 and may be operated by any suitable mechanism in common use for such purpose.

Thus, as the conical clutches 18 and 19 both rotate with the shaft 8 while the pinions 11 and 12 are normally free on that shaft and both pinions are in mesh with the gear wheels 13 and 14 secured on the main line drum shaft 10 to drive that shaft at the two different speeds required; if the axial rod 20 is endwise moved to bring either of the cones 18 or 19 into driving engagement with its pinion 11 or 12, that pinion will rotate with the shaft 8 and through its gear wheel 13 or 14 will rotate the main line drum shaft 10 at the speed for which the connected gears are proportioned, while the other pinion 11 or 12 as the case may be will run free on the shaft 8. The main line drum shaft 10 may thus at will be driven through either pinion 11 or 12 according to the speed desired.

The main line hauling drums 26 are normally free on their shaft 10 and either may be connected to its gear wheel 13 or 14 by a friction clutch mechanism, which not being material to the subject matter of this application need not be either illustrated or described.

This arrangement provides a compact and satisfactory drive for the main line hauling drums, for as stated in the preamble, with the engine running crank over outward the ropes lead to the upper side of all the drums. Either haul-back drum may be connected to wind in its rope, while the other runs free, and either main line drum may be connected to wind on its rope at either of the speeds provided, and the mechanism is simple, compact and easily operated.

Having now particularly described my invention, I hereby declare that what I claim as new and desire to be protected in by Letters Patent, is:

1. In a log hauling engine having haul-back drums and independent main-line drums mounted on separate shafts, means including a shaft distinct from the haul-back drums and the main line drums and intermediate shafts for driving the shaft of the haul-back drums, an intermediate shaft located between the haul-back shaft and the main-line shaft, means for driving the intermediate shaft from the haul-back shaft, and means for driving the main-line shaft from the intermediate shaft, said driving means including mechanism for driving the main line shaft at different speeds.

2. In a log hauling engine having haul-back drums and main-line drums mounted on separate shafts, means for driving the shaft of the haul-back drums, an intermediate shaft located between the haul-back shaft and the main-line shaft, means for driving the intermediate shaft from the haul-back shaft, pinions of different diameters mounted to rotate independently of one another on the intermediate shaft, means on the intermediate shaft for securing either pinion to rotate with it while leaving the other free on the shaft, and means for driving the main-line shaft from either pinion whereby the main-line shaft will be driven through either pinion at the speed for which that pinion is proportioned.

3. In a log hauling engine having haul-back drums and main-line drums mounted on separate shafts, means for driving the shaft of the haul-back drums, an intermediate shaft located between the haul-back shaft and the main-line shaft, means for driving the intermediate shaft from the haul-back shaft, pinions of different diameters mounted to rotate independently of one another on the intermediate shaft, a clutch member rotatable with the intermediate shaft on the outer side of each pinion but susceptible of endwise movement on the shaft, means for connecting the clutch members to simultaneously move endwise to bring one clutch member into engagement with its pinion while releasing the other clutch member from the other pinion, and gear wheels secured on the main-line shaft the teeth of which mesh with the pinions of the intermediate shaft whereby the main-line shaft may be driven through either pinion at the speed for which that pinion and its gear is proportioned.

4. In a log hauling engine having haul-back drums and main-line drums mounted on separate shafts, means for driving the shaft of the haul-back drums, an intermediate shaft located between the haul-back shaft and the main-line shaft, means for driving the intermediate shaft from the haul-back shaft, pinions of different diameters mounted on the intermediate shaft to rotate on it independently of one another, means preventing endwise movement of the pinions on the shaft, a conical clutch member rotatable with the intermediate shaft on the outer side of each pinion but susceptible of endwise movement on the shaft to bring the cone of the clutch into frictional engagement with a corresponding recess of the adjacent pinion, means for connecting the conical clutch members together to move endwise simultaneously to clutch one pinion and release the other, and gear wheels secured on the main-line shaft the teeth of which mesh with those of the pinions.

5. In a log hauling engine having haul-back drums and main line drums mounted on separate shafts, means for driving the shaft of the haul back drums, an intermediate shaft located between the haul-back shaft and the main line shaft, means for driving the intermediate shaft from the haul-back shaft, and means for driving the main line shaft at different speeds from the intermediate shaft, said means comprising pinions free to turn on the intermediate shaft, a collar integral with or secured to the shaft against which collar one side of each pinion bears, a bearing washer on the opposite side of each pinion, feathers secured in the shaft and extending outward from each bearing washer into the adjacent faces of which washers the ends of the feathers are notched, and clutching means endwise movable on the feathers, and adapted to clutch one pinion while the other is free, and means for moving the clutching means endwise.

In testimony whereof I affix my signature.

CHARLES M. STEVENSON.